US012638968B2

(12) United States Patent
　　Choi et al.

(10) Patent No.:　US 12,638,968 B2
(45) Date of Patent:　May 26, 2026

(54) APPARATUS FOR MANAGING STORAGE AND METHOD THEREOF

(71) Applicants: Hyundai Motor Company, Seoul (KR); Kia Corporation, Seoul (KR)

(72) Inventors: Won Seok Choi, Seongnam-Si (KR); Hye Jun Park, Seoul (KR); Sun Joo Moon, Suwon-Si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 153 days.

(21) Appl. No.: 18/386,089

(22) Filed: Nov. 1, 2023

(65) Prior Publication Data

US 2024/0345723 A1　　Oct. 17, 2024

(30) Foreign Application Priority Data

Apr. 13, 2023　(KR) ......................... 10-2023-0048904

(51) Int. Cl.
　　*G06F 3/06*　　　　(2006.01)
(52) U.S. Cl.
　　CPC .......... *G06F 3/0604* (2013.01); *G06F 3/0644* (2013.01); *G06F 3/0673* (2013.01)
(58) Field of Classification Search
　　None
　　See application file for complete search history.

(56) References Cited

U.S. PATENT DOCUMENTS

| | | | | |
|---|---|---|---|---|
| 6,580,424 | B1 * | 6/2003 | Krumm ................... | G06T 17/00 |
| | | | | 345/419 |
| 2002/0188457 | A1 * | 12/2002 | Jenkins .............. | G06Q 30/0645 |
| | | | | 705/5 |
| 2006/0206342 | A1 * | 9/2006 | Shoen .................... | G06Q 20/20 |
| | | | | 705/16 |
| 2009/0113349 | A1 * | 4/2009 | Zohar ................... | G06Q 30/00 |
| | | | | 715/852 |
| 2012/0215572 | A1 * | 8/2012 | Schneur ................ | G06Q 30/06 |
| | | | | 705/5 |
| 2013/0085898 | A1 * | 4/2013 | Qian ...................... | G06Q 30/02 |
| | | | | 705/27.2 |
| 2016/0210602 | A1 * | 7/2016 | Siddique ............... | G16H 10/60 |
| 2017/0091329 | A1 * | 3/2017 | Lau ...................... | G06F 3/04842 |
| 2020/0226912 | A1 * | 7/2020 | Wright ................ | G08B 25/005 |

OTHER PUBLICATIONS

Self-storage.ai (Year: 2025).*

* cited by examiner

*Primary Examiner* — Dennis W Ruhl
(74) *Attorney, Agent, or Firm* — Banner & Witcoff, Ltd.

(57)　　　　ABSTRACT

An apparatus may provide a controller, and a memory configured to store at least one instruction. The at least one instruction when executed by the controller, may cause the apparatus to receive, from a user device, a request for storage information, the request including at least one of storage company information, branch information, or space information for each branch; transmit, to the user device and based on the request, the storage information, receive, from the user device, an experience request for at least a storage of a plurality of storages associated with the storage information, and transmit, to the user device and based on the experience request, experience information for the storage, wherein the experience information may include a three dimensional simulation result associated with the storage.

17 Claims, 10 Drawing Sheets

310　　　　　　　320

330　　　　　　　340

342

702

706

704

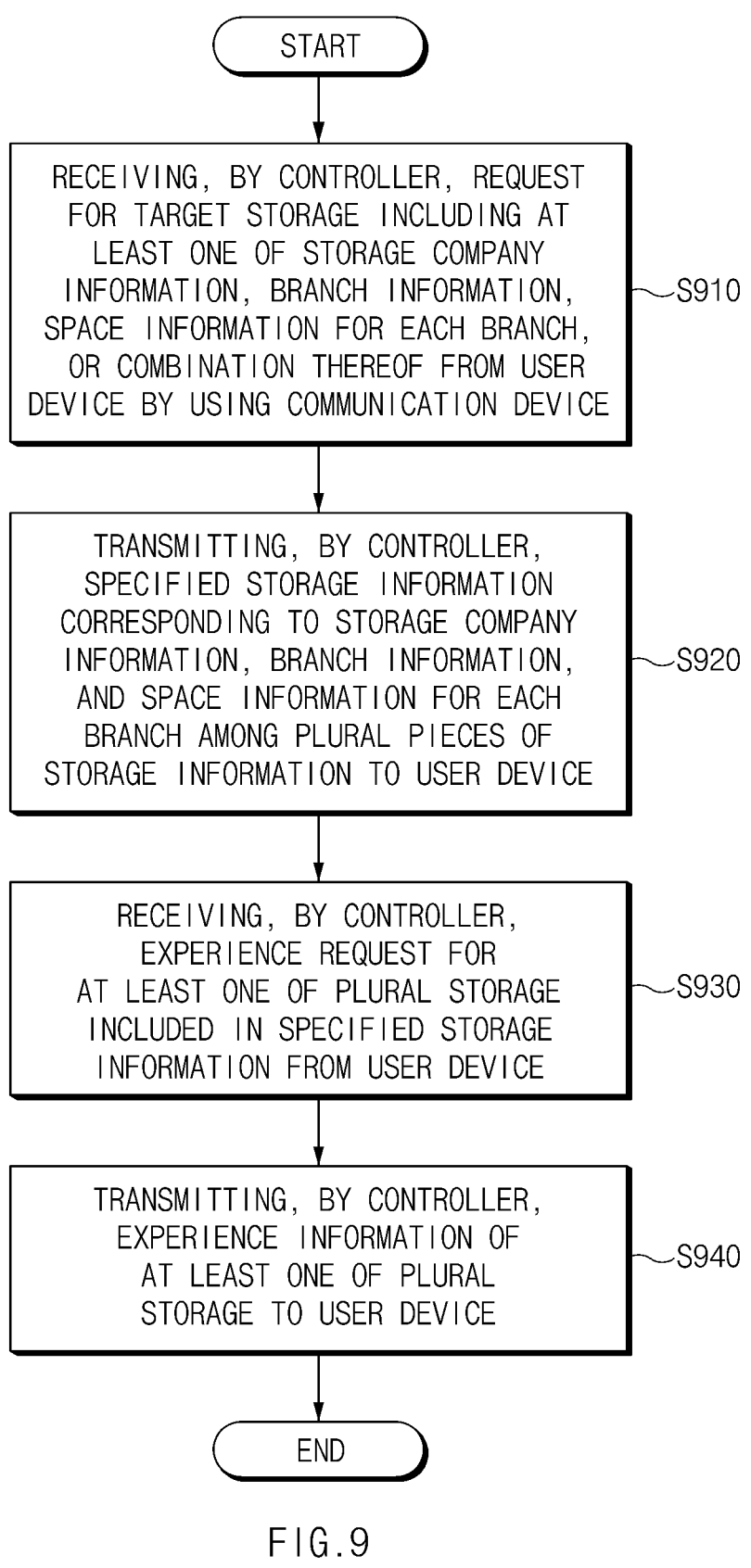

START

RECEIVING, BY CONTROLLER, REQUEST
FOR TARGET STORAGE INCLUDING AT
LEAST ONE OF STORAGE COMPANY
INFORMATION, BRANCH INFORMATION,
SPACE INFORMATION FOR EACH BRANCH,
OR COMBINATION THEREOF FROM USER
DEVICE BY USING COMMUNICATION DEVICE ~S910

TRANSMITTING, BY CONTROLLER,
SPECIFIED STORAGE INFORMATION
CORRESPONDING TO STORAGE COMPANY
INFORMATION, BRANCH INFORMATION,
AND SPACE INFORMATION FOR EACH
BRANCH AMONG PLURAL PIECES OF
STORAGE INFORMATION TO USER DEVICE ~S920

RECEIVING, BY CONTROLLER,
EXPERIENCE REQUEST FOR
AT LEAST ONE OF PLURAL STORAGE
INCLUDED IN SPECIFIED STORAGE
INFORMATION FROM USER DEVICE ~S930

TRANSMITTING, BY CONTROLLER,
EXPERIENCE INFORMATION OF
AT LEAST ONE OF PLURAL
STORAGE TO USER DEVICE ~S940

END

FIG.9

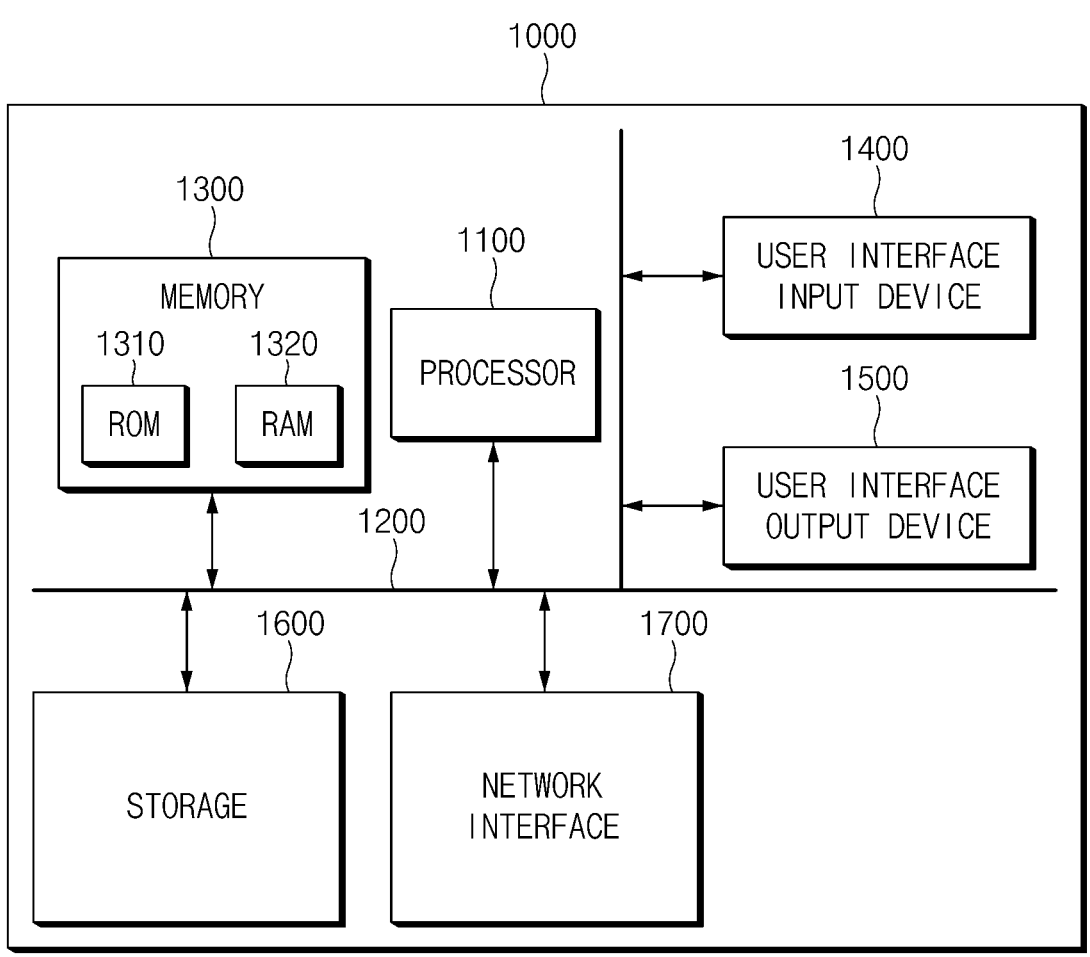
F I G . 10

APPARATUS FOR MANAGING STORAGE AND METHOD THEREOF

CROSS-REFERENCE TO RELATED APPLICATION

This application claims the benefit of priority to Korean Patent Application No. 10-2023-0048904, filed in the Korean Intellectual Property Office on Apr. 13, 2023, the entire contents of which are incorporated herein by reference.

TECHNICAL FIELD

The present disclosure relates to an apparatus for managing storage and method thereof, and more particularly, relates to technology that provides real-time information of a plurality of storage a to user, generates experience information (e.g., simulation information) of specified storage requested by the user, and provides experience information to the user in real time.

BACKGROUND

As the need for storage increase, various types of storage provision services (e.g., self-storage) are provided.

For example, a self-storage service may include a service type that provides a part of a plurality of storage to a user at a cost through at least one branch including a plurality of storage that enable a service company (or manager) to store and load.

The market for providing storage services, such as a self-storage service and the like, is rapidly expanding, and accordingly, there is a need for integrated management of increasing branches.

For example, considering the service characteristics of the storage provision service, because a relatively large number of inquiries and consultations such as phone calls or visits from users occur, as service providers expand their branches, a lot of additional costs are incurred to respond to users.

In addition, the user has the inconvenience of having to visit a corresponding branch of a specific company and experience it himself in order to select a storage type according to the size of the storage or the type of loaded article.

SUMMARY

According to the present disclosure, an apparatus may comprise: a controller; and a memory configured to store at least one instruction that, when executed by the controller, may cause the apparatus to: receive, from a user device, a request for storage information, the request including at least one of storage company information, branch information, or space information for each branch; transmit, to the user device and based on the request, the storage information; receive, from the user device, an experience request for at least a storage of a plurality of storages associated with the storage information; and transmit, to the user device and based on the experience request, experience information for the storage, wherein the experience information comprises a three dimensional simulation result associated with the storage.

The apparatus, wherein the at least one instruction, when executed by the controller, may cause the apparatus to: receive, from the user device, a payment request for the storage; and based on at least one of a reservation schedule of the storage, payment details of the storage, or user information of storage, update the storage information.

The apparatus, wherein the request further includes at least one of: a selection signal for a company among a plurality of companies registered in the apparatus; or a selection signal for at least one branch managed by the company. The apparatus, wherein the memory is configured to store: information about a plurality of companies registered in the apparatus; information about a plurality of branches managed by each of the plurality of companies; and at least one of: real-time reservation status information, storage arrangement information, storage type information, storage usage fee information, temperature information, humidity information, or location information of a branch.

The apparatus, wherein the at least one instruction, when executed by the controller, may cause the apparatus to: identify, based on the storage company information, a company among a plurality of companies registered in the apparatus; identify, based on the branch information, a branch among a plurality of branches managed by the identified company; and include, in the transmitted storage information, at least one of information about the identified company or information about the identified branch.

The apparatus, wherein the at least one instruction, when executed by the controller, may cause the apparatus to include, in the transmitted storage information, at least one of: real-time reservation status information of the identified branch, storage arrangement information, storage type information, storage fee information, temperature usage information, humidity information, or location information of the identified branch.

The apparatus, wherein the at least one instruction, when executed by the controller, may cause the apparatus to: transmit, based on the experience request, 3 dimensional (3D) model information of at least one of the plurality of storages; receive, from the user device, a simulation request signal including a virtual load; generate, based on the simulation request signal and the at least one of the plurality of storages, 3D simulation information; and transmit, to the user device, the generated 3D simulation information.

The apparatus, wherein the at least one instruction, when executed by the controller, may cause the apparatus to: generate, based on the experience request, the 3D model information including a 3D space associated with the at least one of the plurality of storages; add, to at least a part in the 3D space, the virtual load, wherein the virtual load is associated with a drag-and-drop input of a user; and transmit, to the user device and based on the added virtual load, the 3D simulation information.

The apparatus, wherein the at least one instruction, when executed by the controller, may cause the apparatus to: divide, by a size of a grid, at least one of the 3D space or the virtual load; identify, based on the division, a total number of grids, each of the grids having the size; calculate, based on the total number of grids, a load factor of the at least one of the plurality of storages; and transmit, to the user device, the calculated load factor.

The apparatus, wherein the at least one instruction, when executed by the controller, may cause the apparatus to: update in real time, based on communication with the user device, the storage information; provide, based on a management request, real-time image information of a plurality of branches of each of a plurality of companies registered in the apparatus; and provide the storage information updated in real time, or provide notification information including at least one message communicated with external devices in relation to the storage information, and wherein the storage information includes at least one of: a number of registered companies, a number of branches for each company, contract and reservation status, a storage reservation extension rate, a number of storage extensions, a cumulative number of reservations, sales per period, or incidental expenses.

According to the present disclosure, a method may comprise: receiving, by a controller of an apparatus and from a user device, a request for storage information, the request including at least one of storage company information, branch information, or space information for each branch; transmitting, by the controller, based on the receiving the request, and to the user device, the storage information; receiving, by the controller and from the user device, an experience request for at least a storage of a plurality of storages associated with the storage information; and transmitting, by the controller, to the user device, and based on the experience request, experience information for the storage, wherein the experience information comprises a three dimensional simulation result associated with the storage.

The method, further may comprise: receiving, from the user device, a payment request for the storage; and based on at least one of a reservation schedule of the storage, payment details of the storage, or user information of the storage, updating the storage information.

The method, wherein the request includes at least one of: a selection signal for a company among a plurality of companies registered in the apparatus; or a selection signal for at least one branch managed by the company.

The method, further may comprise: storing: information about a plurality of companies registered in the apparatus; information about a plurality of branches managed by each of the plurality of companies; and at least one of: real-time reservation status information, storage arrangement information, storage type information, storage usage fee information, temperature information, humidity information, location information of a branch.

The method, wherein the transmitting the storage information includes: identifying, based on the storage company information, a company among a plurality of companies registered in the apparatus; identifying, based on the branch information, a branch among a plurality of branches managed by the identified company; and including, in the storage information, at least one of information about the identified company or information about the identified branch.

The method, wherein the transmitting the storage information comprises including, in the storage information, at least one of: real-time reservation status information of the identified branch, storage arrangement information, type information, storage usage fee information, temperature information, humidity information, or location information of the identified branch.

The method, wherein the transmitting the experience information includes: transmitting, based on the experience request, 3 dimensional (3D) model information of at least one of the plurality of storages; receiving, from the user device, a simulation request signal including a virtual load; generating, based on the simulation request signal and the at least one of the plurality of storages, 3D simulation information; and transmitting, to the user device, the generated 3D simulation information. The method, wherein the transmitting the experience information includes: generating, based on the experience request, the 3D model information including a 3D space associated with the at least one of the plurality of storages; adding, to at least a part in the 3D space, the virtual load, wherein the virtual load is associated with a drag-and-drop input of a user; and transmitting, to the user device and based on the adding, the 3D simulation information.

The method, wherein the transmitting the experience information comprises: dividing, by a size of a grid, at least one of the 3D space or the virtual load; identifying, based on the dividing, a total number of grids, each of the grids having the size; calculating, based on the total number of grids, a load factor of the at least one of the plurality of storages; and transmitting, to the user device, the calculated load factor.

The method, further may comprise: updating in real time, based on communication with the user device, the storage information; providing, based on a request, real-time image information of a plurality of branches of each of a plurality of companies registered in the apparatus; and providing the storage information updated in real time, or providing notification information including messages communicated with external devices in relation to the storage information, and wherein the storage information includes at least one of: a number of registered companies, a number of branches for each company, contract and reservation status, a storage reservation extension rate, a number of storage extensions, a cumulative number of reservations, sales per period, or incidental expenses.

BRIEF DESCRIPTION OF THE DRAWINGS

The above and other objects, features and advantages of the present disclosure will be more apparent from the following detailed description taken in conjunction with the accompanying drawings:

FIG. 9 shows an example of an operation of an apparatus for managing storage according to an example of the present disclosure; and FIG. 10 shows an example of a computing system for executing a method of managing storage according to an example of the present disclosure.

With regard to description of drawings, the same or similar elements may be marked by the same or similar reference numerals.

DETAILED DESCRIPTION

Figure 1:
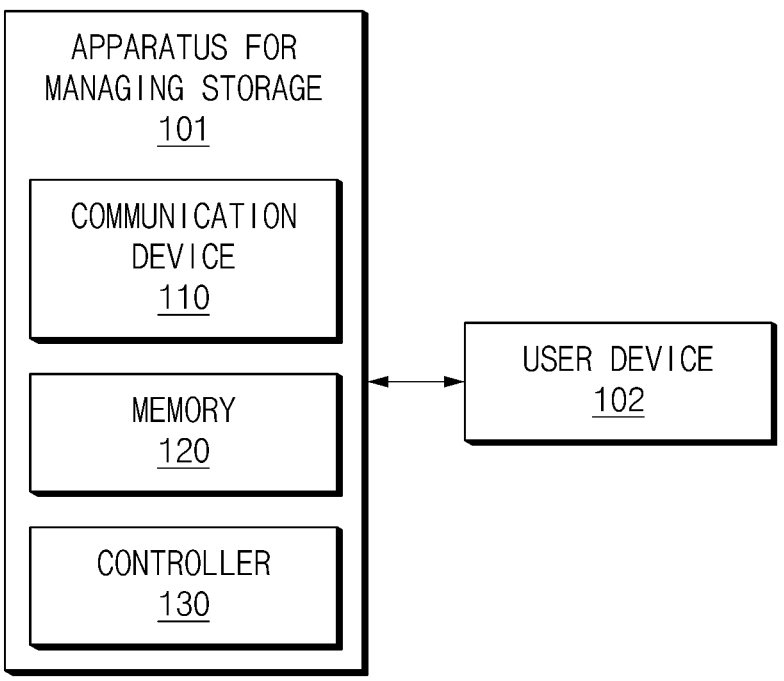
FIG. 1 shows an example of components of an apparatus for managing storage and a user device according to an example of the present disclosure.

Hereinafter, some examples of the present disclosure will be described in detail with reference to the exemplary drawings. In adding the reference numerals to the components of each drawing, it should be noted that the identical or equivalent component is specified by the identical numeral even if they are displayed on other drawings. Further, in describing the example of the present disclosure, a detailed description of the related known configuration or function will be omitted if it is determined that it interferes with the understanding of the example of the present disclosure.

In describing the components of the example according to the present disclosure, terms such as first, second, A, B, (a), (b), and the like may be used. These terms are merely intended to distinguish the components from other components, and the terms do not limit the nature, order or sequence of the components. Unless otherwise defined, all terms including technical and scientific terms used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, examples of the present disclosure will be described in detail with reference to FIGS. 1 to 10.

FIG. 1 shows an example of components of an apparatus for managing storage and a user device according to an example of the present disclosure.

According to an example, an apparatus 101 for managing storage may include at least one of a communication device 110, a memory 120, a controller 130, or a combination thereof. The configuration of the apparatus 101 for managing storage shown in FIG. 1 is exemplary, and examples of the present disclosure are not limited thereto. For example, the apparatus 101 for managing storage may further include components (e.g., at least one of a display, a sensor, an interface, or a combination thereof) not shown in FIG. 1. For example, the storage may include a space (e.g., a storage box) in which items can be contained.

According to an example, a user device 102 may be implemented as various types of portable devices. For example, the user device 102 may include at least one of a mobile phone, a laptop computer, a computer, a tablet, or a combination thereof. For example, the user device 102 may include components identical to and/or similar to at least some of components included in the apparatus 101 for managing storage.

According to an example, the communication device 110 may establish a communication channel (e.g., a wireless communication channel) between the apparatus 101 for managing storage and an external device (e.g., the user device 102) and support communication through the established communication channel. For example, the communication device 110 may include one or more communication processors that operate independently of the controller 130 (e.g., an application processor) and support direct (e.g., communication wired) or wireless communication.

For example, the communication device 110 may include a wireless communication module (e.g., a cellular communication module, a short-range wireless communication module, or a global navigation satellite system (GNSS) communication module) or a wired communication module (e.g., a local area network (LAN) communication module, or a power line communication module). Among these communication modules, a corresponding communication module may communicate with an external device through a first network (e.g., a short-range communication network such as Bluetooth, wireless fidelity (WiFi) direct, or infrared data association (IrDA)) or a second network (e.g., a wide area network such as a legacy cellular network, a 5G network, a next-generation communication network, Internet, or a computer network (e.g., LAN or WAN)) included in a network. These various types of communication modules may be integrated as one component (e.g., a single chip) or implemented as a plurality of separate components (e.g., multiple chips). In addition or alternative, the communication device 110 and the controller 130 may be implemented as a single chip.

For example, the communication device 110 may transmit and receive various data based on communication with an external device.

For example, the communication device 110 may receive various control signals (or request signals) from the user device 102, and transmit at least one response signal generated based on the received signal to the user device 102.

According to an example, the memory 120 may store instructions or data. For example, the memory 120 may store one or more instructions that cause the apparatus for managing storage 100 to perform various operations if executed by the controller 130.

For example, the memory 120 and the controller 130 may be implemented as one chipset. The controller 130 may include at least one of a communication processor and a modem.

For example, the memory 120 may store various pieces of information associated with the apparatus 101 for managing storage. For example, the memory 120 may store information about the operation history of the controller 130. For example, the memory 120 may store at least one of information about a plurality of companies registered in the apparatus for managing storage, information about a plurality of branches managed by each of the plurality of companies, real-time reservation status information, storage arrangement information, storage type information, storage usage fee information, temperature information, humidity information, location information of the specified branch, or a combination thereof.

For example, the memory 120 may update at least some of stored data based on communication with the apparatus 101 for managing storage and the user device 102. For example, if the apparatus 101 for managing storage receives a payment request for at least one of the plurality of storage from the user device 102, the apparatus 101 for managing storage may update a plurality of pieces of storage information based on at least one of the storage reservation schedule, payment details, user information, or a combination thereof included in the payment request, and store the updated data in the memory 120.

For example, the memory 120 may store, under the control of the controller 130, information about a plurality of companies registered in the apparatus for managing storage, information about a plurality of branches managed by each of the plurality of companies, and at least one of real-time reservation status information, storage arrangement information, storage type information, storage usage fee information, temperature information, humidity information, location information of the specified branch, or a combination thereof.

According to an example, the controller 130 may be operatively connected to at least one of the communication device 110, the memory 120, or a combination thereof. For example, the controller 130 may control the operation of at least one of the communication device 110, the memory 120, or a combination thereof.

For example, the controller 130 may communicate with an outside by using the communication device 110. For example, the controller 130 may transmit and receive various data to and from the user device 102 by using the communication device 110.

According to an example, the controller 130 may transmit different information based on the type of request signal received by using the communication device 110. For example, the controller 130 may transmit different information based on different types of request signals received from a user who desires to receive a storage provision service or a manager who desires to provide the storage provision service. For example, the controller 130 may identify the user device 102 logged in to a user mode and transmit information corresponding to the user mode. For example, the controller 130 may identify a manager device logged in to a manager mode and transmit information corresponding to the manager mode.

For example, the controller 130 may receive various request signals from the user device 102 by using the communication device 110. For example, the controller 130 may receive a request for target storage including at least one of storage information, branch information, company space information for each branch, or a combination thereof from the user device 102. In this case, the user device 102 may be defined as a personal device of a user who desires to receive a storage provision service, but examples of the present disclosure are not limited thereto. For example, the user device 102 may include an external device logged in to user mode.

For example, the controller 130 may receive various request signals from the manager device by using the communication device 110. For example, the controller 130 may transmit, to a manager device, at least one of the manager's company information, real-time video (e.g., CCTV video) information for at least one branch included in a company, information about a plurality of storage included (or installed) in each branch, notification information including messages transmitted and received with external devices (e.g., the user device 102) regarding a plurality of pieces of storage information, or a combination thereof. For example, the plurality of pieces of storage information may include the number of companies registered in the apparatus 101 for managing storage, the number of branches for each company, contract and reservation status, a storage reservation extension rate, a storage extension number, the cumulative number of reservations, sales per period, incidental expenses, or a combination thereof. For example, a manager device may include an external device logged in to a manager mode.

In an example, based on receiving a request for target storage, the controller 130 may transmit specified storage information corresponding to storage company information, branch information, and space information for each branch among a plurality of pieces of storage information to a user device 102.

For example, storage company information may be generated based on selecting a specified company from among a plurality of storage companies displayed on the user device 102 by a user, and include data transmitted from the user device 102 to the apparatus 101 for managing storage.

For example, the branch information may be generated based on selecting, by a user, a specified branch from among at least one branch of a specified company displayed after selecting the specified company on the user device 102, and include data transmitted from the user device 102 to the apparatus 101 for managing storage.

For example, the space information for each branch may include a user interface related to at least one storage within a specified branch displayed after a user selects the specified branch.

For example, the request for the target storage may include at least one of a selection signal for a specified company among a plurality of companies registered in the apparatus 101 for managing storage, a selection signal for at least one branch managed by the specified company, or a combination thereof.

In an example, the controller 130 may transmit storage company information among the plurality of pieces of storage information, branch information, and specified storage information corresponding to space information for each branch to the user device 102.

For example, the controller 130 may identify a specified company and a specified branch determined by the user's selection, and transmit the specified storage information included (or installed) in the specified branch to the user device 102.

For example, the controller 130 may identify a specified company corresponding to the storage company information received from the user device 102 among a plurality of companies registered in the apparatus 101 for managing storage.

For example, the controller 130 may identify a specified branch corresponding to the branch information received from the user device 102 among a plurality of branches managed by a specified company.

For example, the controller 130 may transmit, to the user device 102, the specified storage information that includes at least one real-time reservation status information of the specified branch, storage arrangement information, storage type information, storage usage fee information, temperature information, humidity information, location information of the specified branch, or a combination thereof.

In an example, the controller 130 may receive a request for experiencing at least one of the plurality of storage included in the specified storage information from the user device 102 by using the communication device 110.

For example, the experience request may include a request signal for requesting virtual experience of at least one storage included (or installed) in a branch specified among the specified storage information displayed on the user device 102 by the user.

In an example, the controller 130 may transmit the experience information about at least one of the plurality of storage to the user device 102 based on receiving the experience request by using the communication device 110.

For example, the controller 130 may generate a 3D space corresponding to at least one of the plurality of storage based on receiving the experience request, and transmit 3D model information including the generated 3D space to the user device 102. For example, the 3D model information may include at least one of a 3D space corresponding to a storage selected by a user, a 3D object corresponding to at least one loaded article, or a combination thereof.

For example, the controller 130 may further receive a simulation request signal from the user device 102. For example, the controller 130 may receive a simulation request signal generated by performing a specified input (e.g., a drag and drop input) with respect to the user device 102 displaying 3D model information by the user through the communication device 110. For example, if a user provides a drag-and-drop input from a 3D object to a 3D space corresponding to storage to the user device 102, the user device 102 may transmit a simulation request signal including the input to the apparatus 101 for managing storage. In this case, the apparatus 101 for managing storage may generate 3D simulation information of adding a 3D object (e.g., a virtual load) corresponding to the drag-and-drop input to at least a part of the 3D space corresponding to the storage, and transmit the generated 3D simulation information to the user device 102.

For example, the controller 130 may divide at least one of a 3D space, a virtual load, or a combination thereof based on a grid having a specified size, and identify the number of grids. For example, the controller 130 may identify the width, length, and height of the storage corresponding to the 3D space and virtual load and divide them into grids having a size of 1 cm, 1 cm and 1 cm, respectively to identify the number of grids.

For example, if the width, length, and height of the storage are 100 cm, 100 cm and 120 cm, respectively, the controller 130 may identify the total number of grids of the storage as 1,200,000.

For example, if the width, length, and height of the virtual load are 48 cm, 38 cm and 34 cm, respectively, the controller 130 may identify the total number of grids of the virtual load as 62,016.

For example, if a user transmits a simulation request signal through a plurality of virtual loads, the controller 130 may multiply the number of selected virtual loads to identify the total number of grids of the corresponding virtual loads.

For example, the controller 130 may calculate a load factor of at least one of the plurality of storage based on the total number of grids of the 3D space (or storage) and the total number of grids of the virtual loads, and transfers the load factor to the user device 102.

For example, the load factor may be a value obtained by dividing the total number of grids of virtual loads by the total number of grids in the 3D space and then multiplying by 100.

Hereinafter, various example of the present disclosure will be described through at least one user interface displayed by an apparatus for managing storage (e.g., the apparatus 101 for managing storage of FIG. 1) and/or a user device (e.g., the user device 102 of FIG. 1). For example, the drawings shown in FIGS. 2 to 4 may include at least one user interface that a user device provides to a user. For example, the diagrams shown in FIGS. 5 to 7 may include at least one user interface provided by an apparatus for managing storage to a manager.

Figure 2:
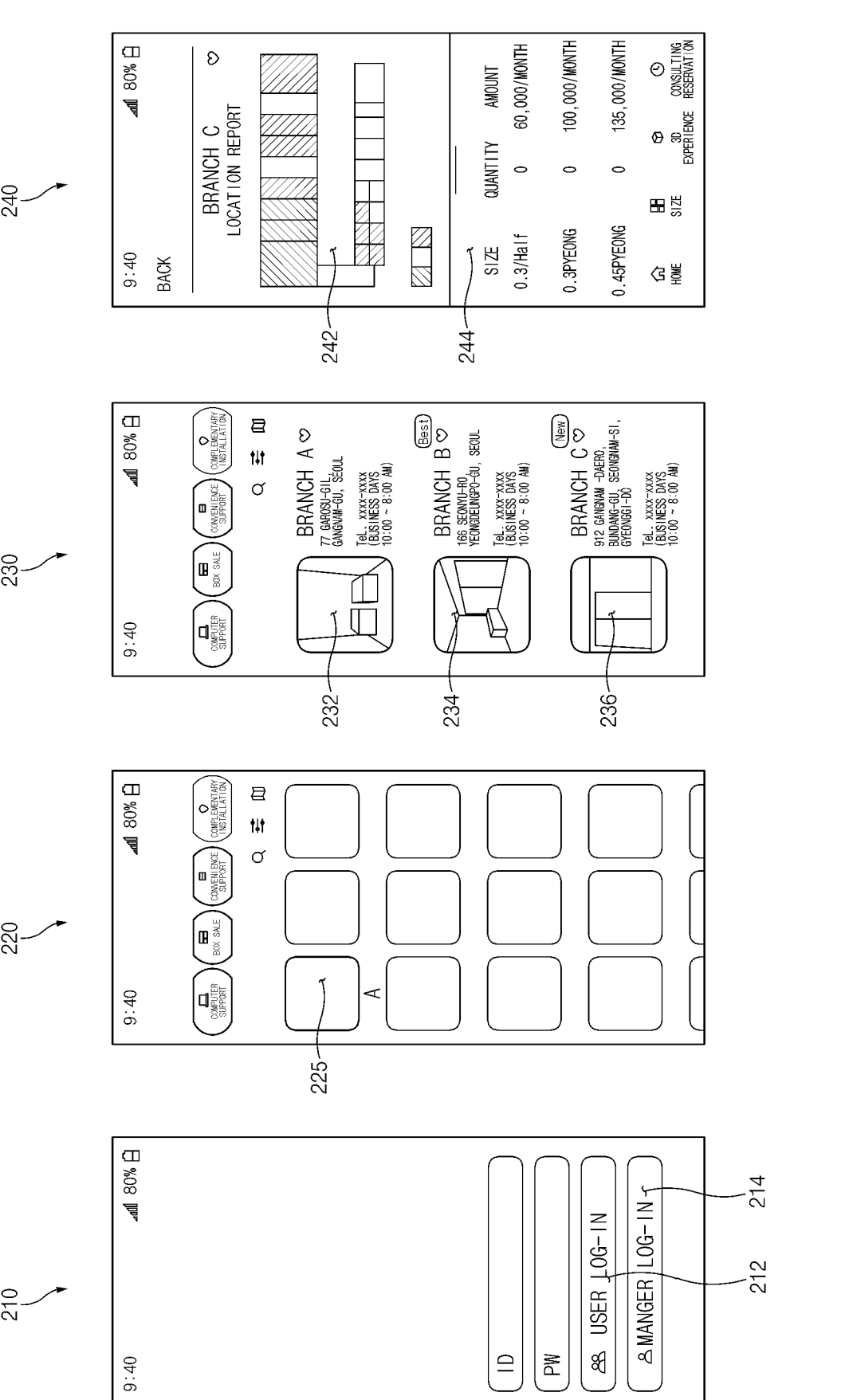
FIG. 2 shows an example of a screen provided through an apparatus for managing storage and a user device according to an example of the present disclosure.

FIG. 2 shows an example of a screen provided through an apparatus for managing storage and a user device according to an example of the present disclosure.

According to an example, a user device (e.g., the user device 102 of FIG. 1) may provide various user interfaces to a user. The diagram shown in FIG. 2 may be referred to as an example of a screen displayed by a user device through at least one display device (e.g., a display).

Referring to reference numeral 210, according to an example, the user device may display a user interface including an initial login screen.

For example, the login screen may include a user login tab 212 and a manager login tab 214. Based on receiving a touch input to the user login tab 212, the user device may further display a interface for user inputting identification information (e.g., ID and/or PASSWORD) for user identification.

For example, based on receiving a touch input for the manager login tab 214, the user device may further display a user interface for inputting identification information for manager identification. An example of the user interface displayed by the device after manager login will be disclosed in more detail in the description of FIGS. 5 to 7 to be described later.

Referring to reference numeral 220, according to an example, the user device may display a graphic user interface (GUI) (e.g., icon) related to at least one storage company registered in an apparatus for managing storage (e.g., the apparatus 101 for managing storage of FIG. 1 or a server).

For example, although not shown, the user device may further display a map including location information for each storage company.

For example, the user device may transmit storage company information corresponding to an icon for which a touch input is received to the apparatus for managing storage, based on receiving a touch input for at least a portion of the GUI.

For example, the user device may identify a specified company (e.g., company A) corresponding to an area 225 where the touch input is received among a plurality of storage companies, and transmit a request for target storage including information about the specified company to the apparatus for managing storage.

Referring to reference numeral 230, according to an example, the user device may display a GUI for each of a plurality of branches managed by a specified company.

For example, the user device may display an icon corresponds to each of a plurality of branches operated by a specified company (e.g., company A) corresponding to the area 225 where a touch input is received in the user interface display screen indicated by reference numeral 220.

For example, the user device may display a first branch icon 232 corresponding to branch A operated by company A.

For example, the user device may display a second branch icon 234 corresponding to branch B operated by company A.

For example, the user device may display a third branch icon 236 corresponding to branch C operated by company A.

Referring to reference numeral 240, according to an example, the user device may display information about at least one storage included (or installed) in branch C.

For example, if receiving a touch input to the third branch icon 236 on the user interface display screen indicated by reference numeral 230, the user device may display specified storage information about at least one storage included in a specified branch (e.g., branch C) corresponding to the third branch icon 236. The specified storage information may be at least a piece of information received from the apparatus for managing storage after the user device transmits a request for target storage generated based on a touch input received from the user to the apparatus for managing storage.

For example, the specified storage information may include at least one of arrangement information of a plurality of storage included in the third branch displayed on the first area 242, type information, temperature information, humidity information, location information of a specified branch, or a combination of.

For example, the specified storage information may include at least one of real-time reservation information of the storage displayed in the second area, storage usage fee information, a user interface for reservation, or a combination thereof. The user may reserve (or select) at least some of the storage included in the third branch through an input to the user interface indicated by reference numeral 240.

Figure 3:
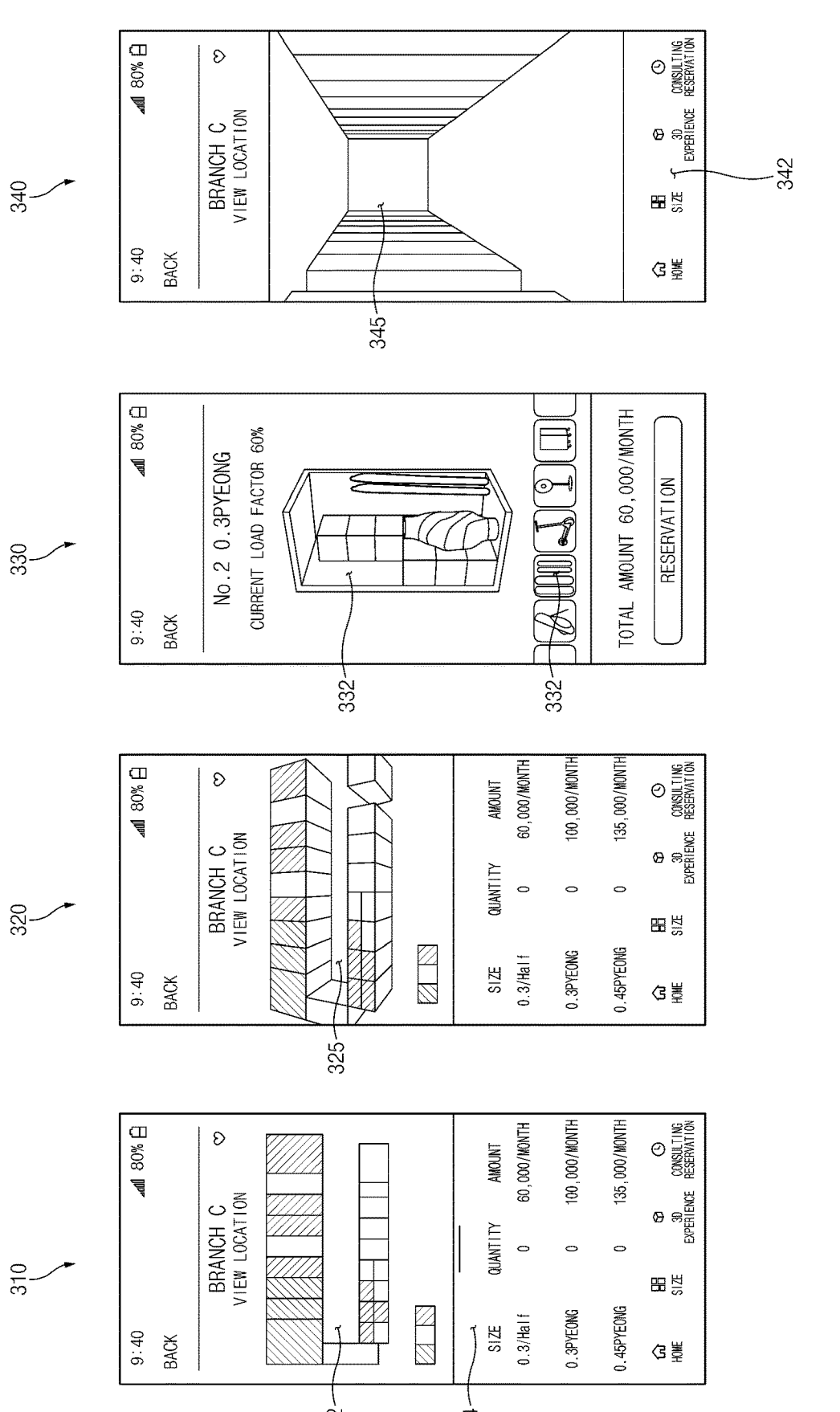
FIG. 3 shows an example of a screen provided through an apparatus for managing storage and a user device according to an example of the present disclosure.

FIG. 3 shows an example of a screen provided through an apparatus for managing storage and a user device according to an example of the present disclosure.

FIG. 3 shows an example of a screen provided through an apparatus for managing storage and a user device according to an example of the present disclosure.

According to an example, a user device (e.g., the user device 102 of FIG. 1) may provide various user interfaces to a user. The diagram shown in FIG. 3 may be referred to as an example of a screen displayed by a user device through at least one display device (e.g., a display).

Referring to reference numeral 310, according to an example, the user device may display various screens based on the user's input to the user interface indicated by reference numeral 240 of FIG. 2

For example, if receiving a touch input for at least some of the plurality of storage icons displayed in a first area 312 (e.g., the first area 242 of FIG. 2) from the user, the user device may highlight the area where the touch input is received or display the area in a different color. Referring to reference numeral 310, storage under an event (e.g., price reduction), storage available for reservation, storage in use, and storage selected by the user may be displayed in different manners. For example, it may be displayed in at least one of different colors, fonts, sizes, checkered patterns, a or combination thereof.

For example, if receiving a touch input for at least a part of the user interface displayed on a second area 314 (e.g., the second area 244 of FIG. 2) from the user, the user device may display at least one of the size, quantity, price of storage to be reserved, or a combination thereof on the second area 314 based on the touch input. As an example, referring to reference numeral 310, based on the touch input of the user, the user device may display on the second area 314 a user interface including information indicating that three pieces of 0.3 pyeong/half type storages are reserved at 160,000 won/month and one piece of 0.3 pyeong type storage is reserved at 100,000 won/month.

Referring to reference numeral 320, according to an example, the user device may display storage type information and storage arrangement information on a 3D screen.

For example, the user device may convert storage type information and storage arrangement information being displayed in the first area 312 indicated by reference numeral 310 to a 3D screen based on a user's specified input (e.g., a touch input to a specific area) and display the 3D screen.

Referring to reference numeral 330, according to an example, the user device may display a storage experience screen based on a user's input for a specified area (e.g., a "3D experience" tab among screens of reference numerals 310 and 320).

For example, the user device may transmit an experience request including a user input for a specified area. The experience request may include a request for 3D model information and/or simulation information of a specific storage.

For example, the user device may display a screen indicated by reference numeral 330 based on the 3D model information and/or simulation information received from the apparatus for managing storage.

For example, the user device may display a 3D space 332 corresponding to storage. The 3D space 332 may be an object generated through 3D modeling of a specific storage that a user desires to reserve.

For example, the user device may transmit a simulation request signal to the apparatus for managing storage based on a user's input (e.g., a drag-and-drop input) to a virtual load interface 334 including at least one virtual load.

For example, the user device may receive 3D simulation information obtained by adding a virtual load corresponding to a drag-and-drop input to at least a part of the 3D space 332 from the apparatus for managing storage and then, finally display the information to the user. For example, the drag-and-drop input may be defined as a drag input from some of a plurality of virtual loads included in the virtual load interface 334 to the 3D space 332.

For example, the apparatus for managing storage may divide at least one of a 3D space, a virtual load, or a combination thereof based on a grid having a specified size and identify the number of grids. For example, the apparatus for managing storage may identify the width, length, and height of the storage and virtual load corresponding to the 3D space and divide them into grids having a size of 1 cm, 1 cm and 1 cm, respectively to identify the number of grids.

For example, the apparatus for managing storage may calculate a load factor of at least one of the plurality of storage based on the total number of grids of the 3D space 332 (or storage) and the total number of grids of the virtual loads, and transfers the load factor to the user device 102. The user device may display the received load factor to the user. For example, the load factor may be a value obtained by dividing the total number of grids of a virtual load by the total number of grids in the 3D space and then multiplying by 100.

Referring to reference numeral 340, according to an example, the user device may convert and display an internal space (e.g., a storage arrangement space) of a specified branch (e.g., branch C in FIG. 2) into a 3D screen.

For example, based on receiving a user input (e.g., a touch input) for a 3D experience tab 342, the user device may display information about the storage arrangement space of branch C on a 3D screen.

Figure 4:
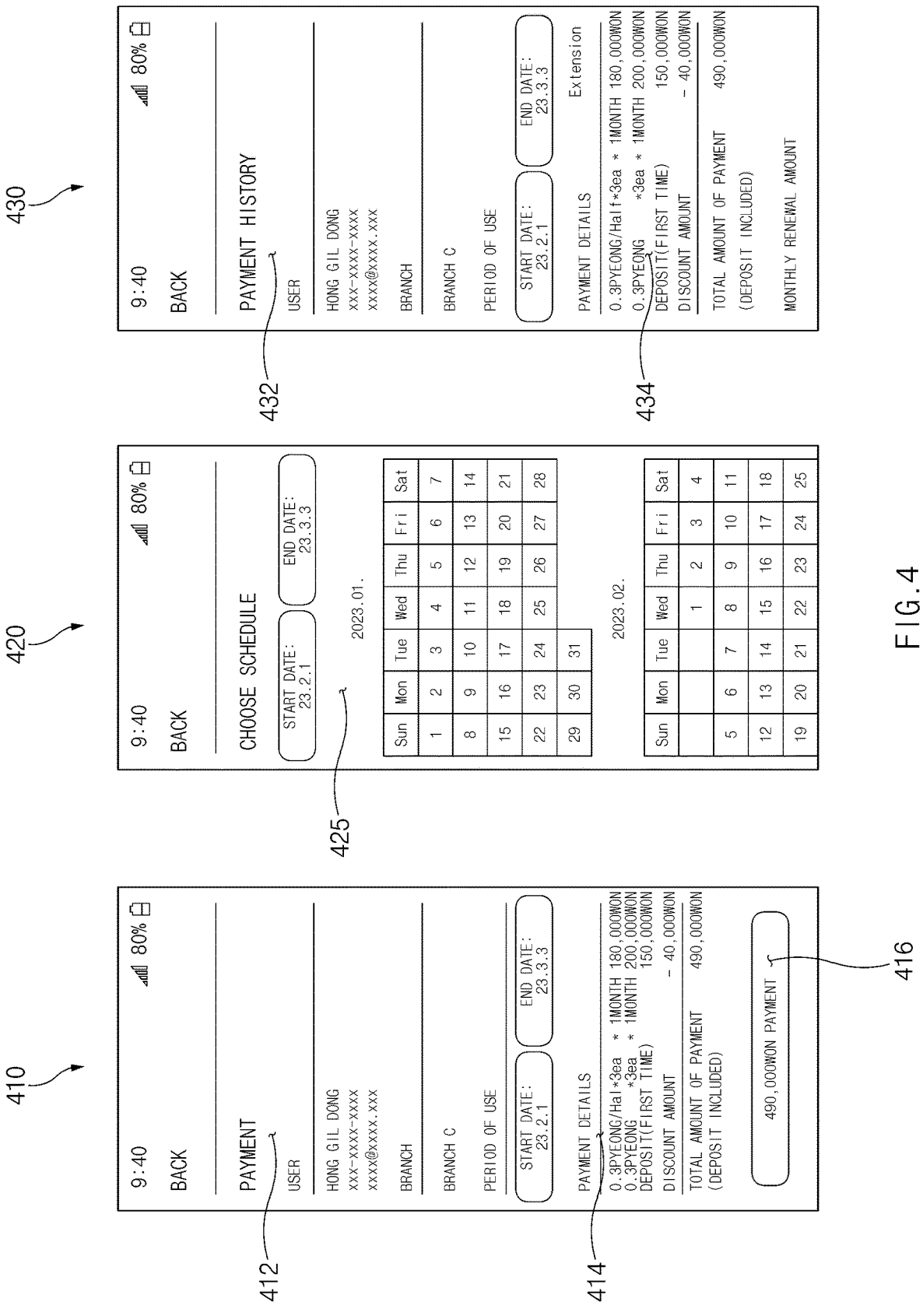
FIG. 4 shows an example of a screen provided through an apparatus for managing storage and a user device according to an example of the present disclosure.

FIG. 4 shows an example of a screen provided through an apparatus for managing storage and a user device according to an example of the present disclosure.

Referring to reference numeral 410, according to an example, the user device may display a payment screen based on receiving the reservation input of the user.

For example, the user device may display user information (e.g., user name, phone number, e-mail address, or the like), branch information (e.g., branch area name, branch location, or the like), and a usage period in a first payment area 412.

For example, the user device may display detailed payment information (e.g., reserved storage type, reserved storage number, total payment amount, or the like) in a second payment area 414.

Referring to reference numeral 420, according to an example, the user device may display a user interface for selecting a reservation schedule (or a period).

For example, the user device may display at least one user interface allowing the user to select a storage reservation schedule.

Referring to reference numeral 430, according to an example, the user device may display a user interface for confirming final payment details.

For example, if the user selects a storage reservation schedule and completes payment, the user device displays reservation details including the final payment details and reservation schedule to the user in a first final display area 432.

For example, if the user selects a storage reservation schedule and completes payment, the user device may display reservation details including the type of storage for which the reservation is confirmed, the reservation period, the payment amount, and the discount amount, and the renewal amount in a second final display area 434 for the user.

Figure 5:
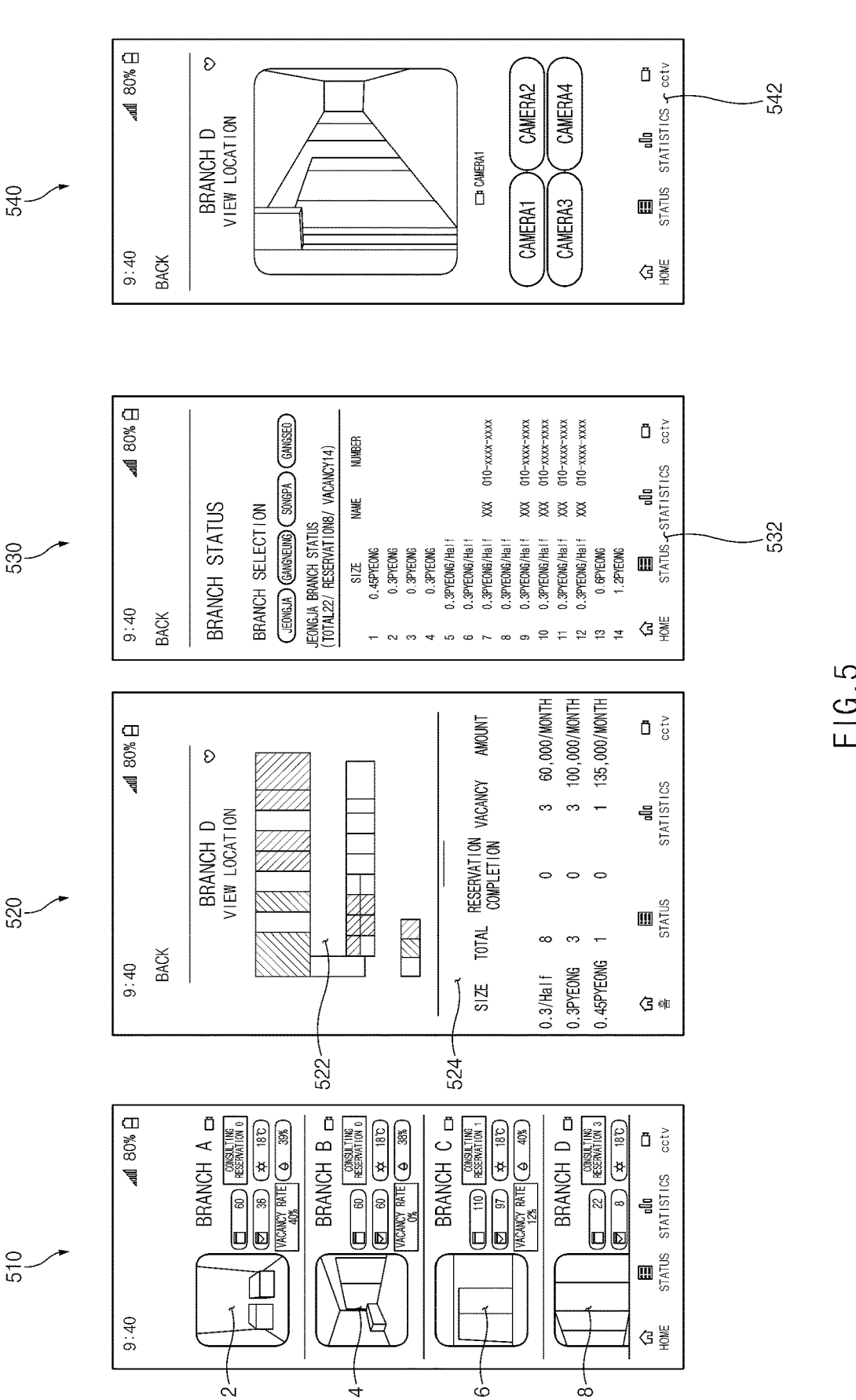
FIG. 5 shows an example of a screen provided through an apparatus for managing storage and a user device according to an example of the present disclosure

FIG. 5 shows an example of a screen provided through an apparatus for managing storage and a user device according to an example of the present disclosure.

According to an example, a manager device (or the apparatus 101 for managing storage of FIG. 1) may provide various user interfaces to the user. The diagram shown in FIG. 5 may be referred to as an example of a screen displayed by a manager device through at least one display device (e.g., a display). For example, the screens according to FIGS. 5 to 7 may be referred to as screens after a manager logs in as an administrator after performing a touch input to a manager login tab (e.g., the manager login tab 214 of FIG. 2) through a manager device.

Referring to reference numeral 510, according to an example, the manager device may display information about a plurality of branches included in a company operated by a manager.

For example, the manager device may display a first branch icon 512 corresponding to branch A operated by the manager's company.

For example, the manager device may display a second branch icon 514 corresponding to branch B operated by the manager's company.

For example, the manager device may display a third branch icon 516 corresponding to branch C operated by the manager's company.

For example, the manager device may display a fourth branch icon 518 corresponding to branch D operated by the manager's company.

Referring to reference numeral 520, according to an example, the manager device may display information about at least one storage included (or installed) in branch D.

For example, if receiving a touch input to the fourth branch icon 518 of the user interface display screen indicated by reference numeral 510, the manager device may display specified storage information about at least one storage included in a specified branch (e.g., branch D) corresponding to the fourth branch icon 518. The specified storage information may be at least a piece of information received from the apparatus for managing storage after the manager device transmits a request for target storage generated based on a touch input received from the manager to the apparatus for managing storage.

For example, the specified storage information may include at least one of arrangement information, type information, temperature information, humidity information, location information of a specified branch, or a combination thereof of a plurality of storage included in the fourth branch (or branch D) displayed in a first manager area 522.

For example, the specified storage information may include at least one of real-time reservation information of storage displayed in a second manager area 524, storage usage fee information, reservation status, vacancies, the total number of locations, or a combination thereof.

Referring to reference numeral 530, according to an example, the manager device may display the reservation status and reservation information for each branch of the company operated by the manager.

For example, if receiving a user input for a current status tab 532 and then receiving a selection input for a specified branch, the manager device may display at least one of the total number of storage of the specific branch corresponding to the selection input, the total number of reservations, the total number of vacancies, a storage type, a storage user name, user contact information, or a combination thereof.

Referring to reference numeral 540, according to an example, the manager device may display real-time image information (e.g., CCTV image information) for each branch of a company operated by a manager.

For example, if a user input for a CCTV tap 542 is received, the manager device may display real-time image information being acquired through a camera installed at a selected branch to the user.

For example, the manager device may further display a security company contact button on at least a part of the display screen indicated by reference numeral 540. If a user input for the contact security company button is received, it is possible to immediately attempt communication with the security company.

Figure 6:
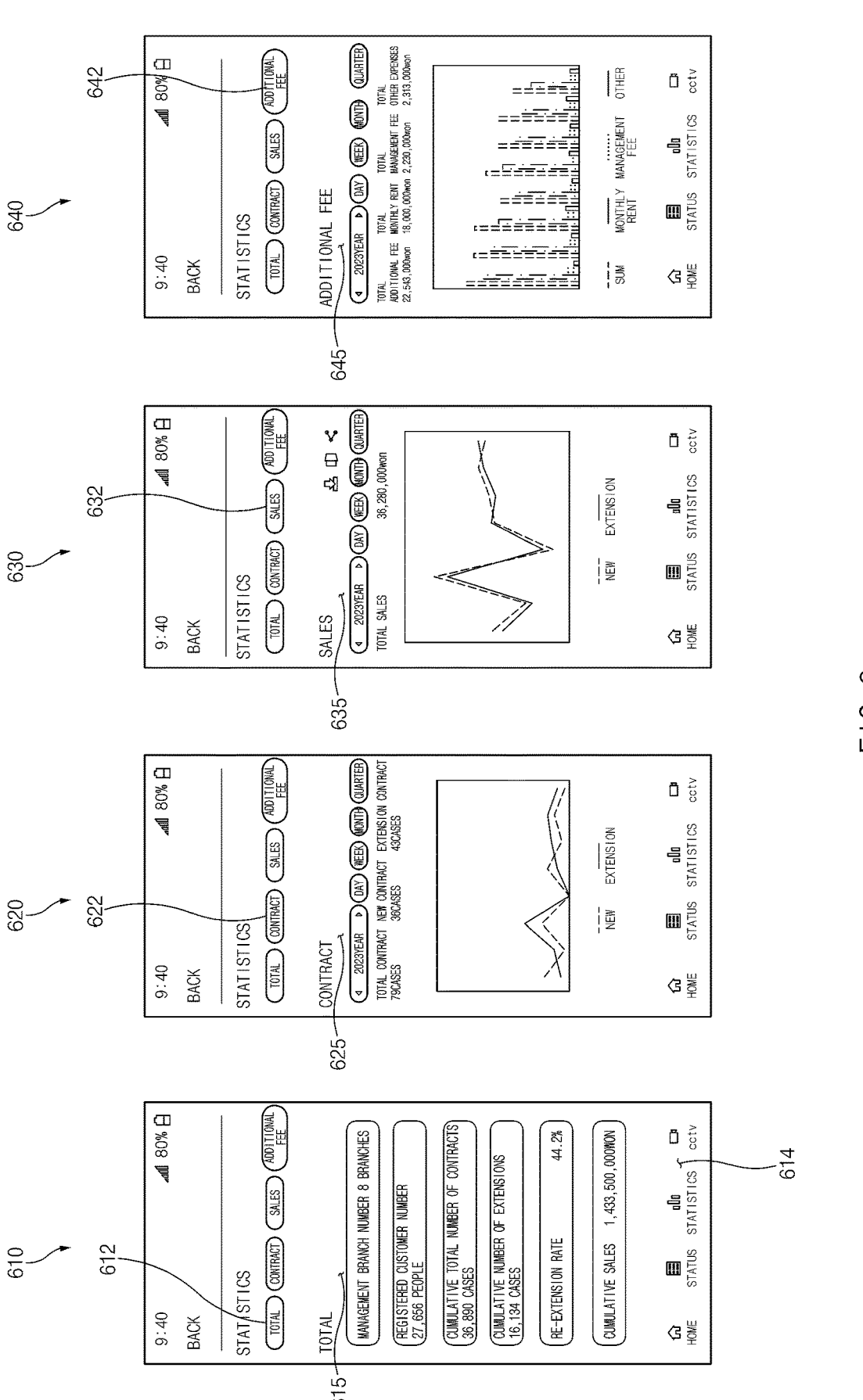
FIG. 6 shows an example of a screen provided through an apparatus for managing storage and a user device according to an example of the present disclosure

FIG. 6 shows an example of a screen provided through an apparatus for managing storage and a user device according to an example of the present disclosure.

Referring to reference numeral 610, according to an example, the manager device may display the operating status of a company operated by a manager.

For example, if a user input for a statistics tab 614 is received and then a user input for a total tab 612 is received, the manager device may display, on a statistics screen 615, at least one of the number of companies registered to the apparatus for managing storage, the number of branches for each company, contract and reservation status, a storage reservation extension rate, the number of storage extensions, the cumulative number of reservations, the cumulative number of extensions, cumulative sales, or a combination thereof.

Referring to reference numeral 620, according to an example, the manager device may display the operating status of a company operated by a manager.

For example, if receiving a user input for a contract tab 622 after receiving a user input for the statistics tab 614, the manager device may display, on a statistic screen 625, information about at least one of total contracts by period, new contracts, extended contracts, or a combination thereof through at least one of text, a bar graph, a broken line graph, or a combination thereof.

Referring to reference numeral 630, according to an example, the manager device may display the operating status of a company operated by the manager.

For example, if receiving a user input for a sales tab 632 after receiving a user input for the statistics tab 614, the manager device may display, on a sales screen 635, information about at least one of sales by period, total sales, monthly sales, or a combination thereof as a broken line graph.

Referring to reference numeral 640, according to an example, the manager device may display the operating status of a company operated by a manager.

For example, if receiving a user input for an incidental expense tab 642 after receiving a user input for the statistics tab 614, the manager device may display, on an incidental expense screen 645, information about at least one of incidental expenses by period, the total incidental expenses, monthly incidental expenses, or a combination thereof as a bar graph.

Figure 7:
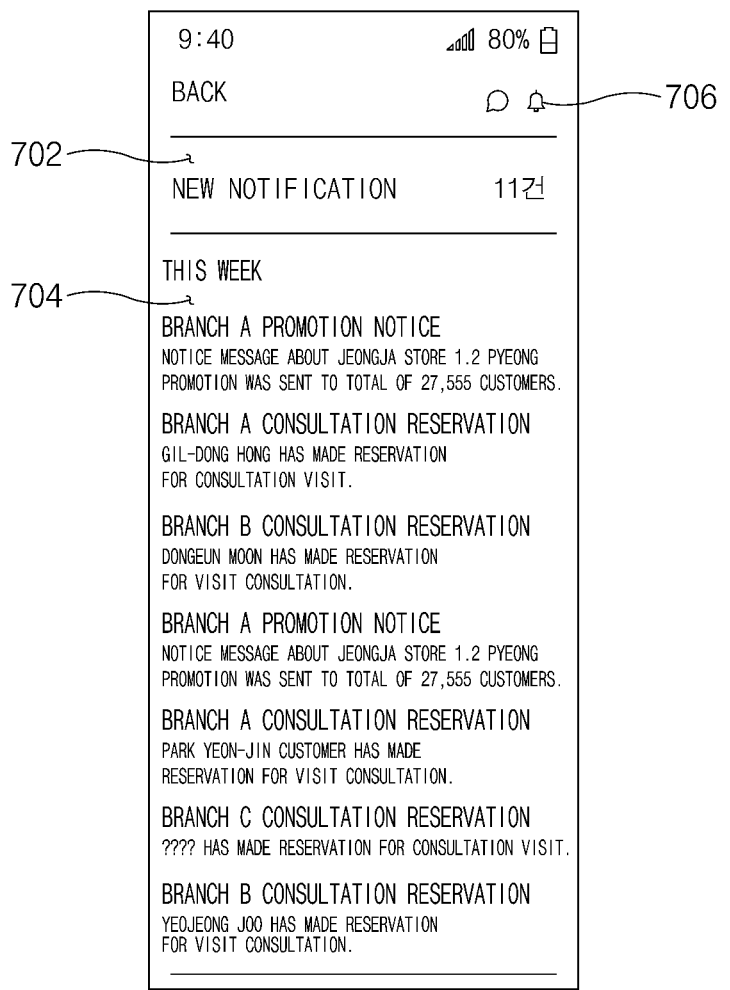
FIG. 7 shows an example of a screen provided through an apparatus for managing storage and a user device according to an example of the present disclosure.

FIG. 7 shows an example of a screen provided through an apparatus for managing storage and a user device according to an example of the present disclosure.

Referring to reference numeral 700, according to an example, the manager device may display notification information about a company operated by a manager.

For example, if receiving a user input for a notification tab 706, the manager device may display the number of new notifications in a notification summary area 702.

For example, if receiving a user input for the notification tab 706, the manager device may display notification information related to each branch of a company operated by the manager on a notification information screen 704 in chronological order.

Figure 8:
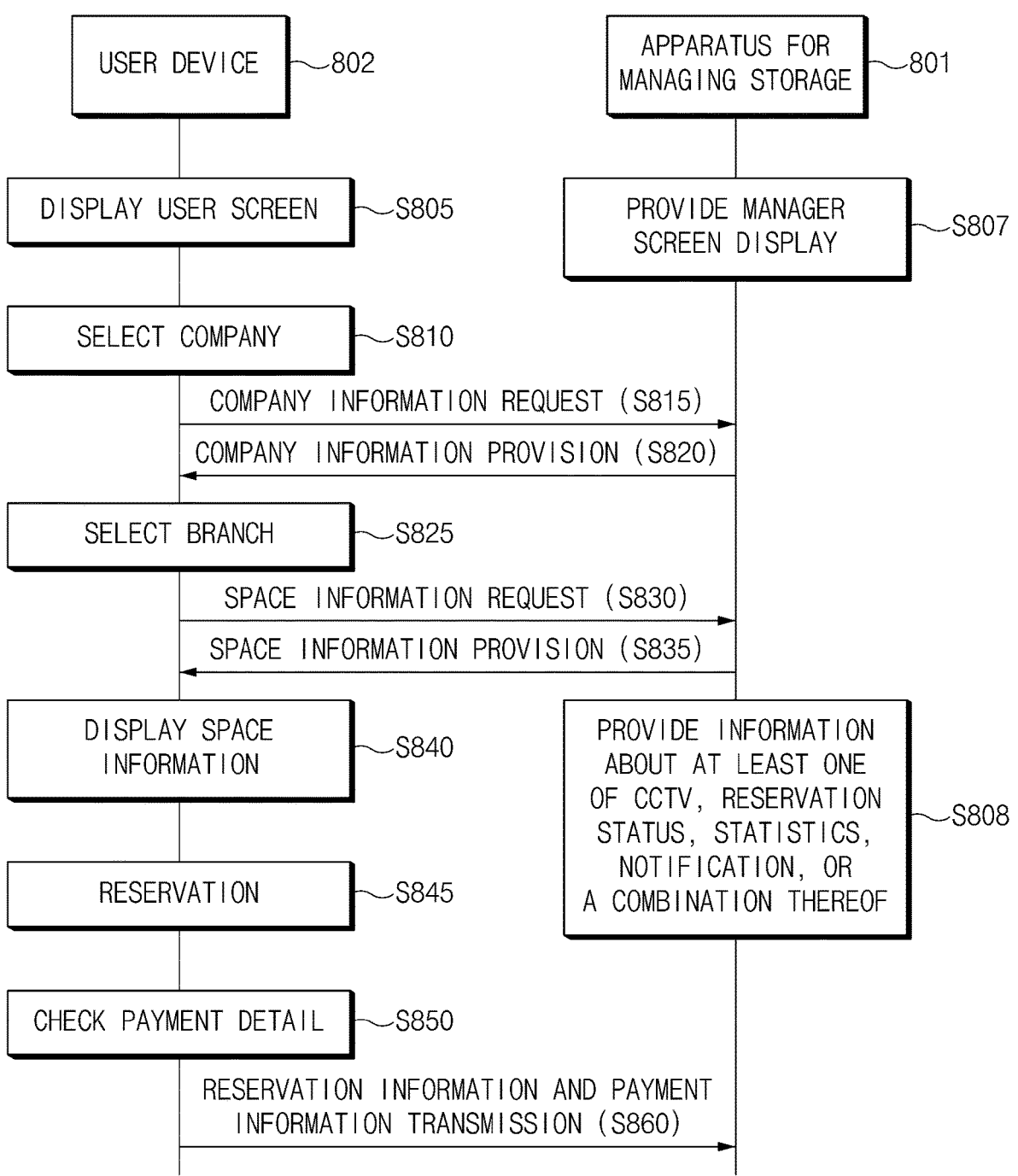
FIG. 8 shows an example of an operation of an apparatus for managing storage and a user device according to an example of the present disclosure.

FIG. 8 shows an example of an operation of an apparatus for managing storage and a user device according to an example of the present disclosure.

According to an example, an apparatus 801 for managing storage (e.g., the apparatus 101 for managing storage of FIG. 1) and/or a user device 802 (e.g., the user device 102 of FIG. 1) may perform operations shown in FIG. 8. For example, at least some of the components included in the apparatus 801 for managing storage (e.g., the communication device 110, the memory 120, and/or the controller 130 of FIG. 1) may be configured to perform the operations of FIG. 8.

In the following example, operations of S805 to S860 may be sequentially performed, but are not necessarily sequentially performed. For example, the order of each operation may be changed, or at least two operations may be performed in parallel. In addition or alternative, contents corresponding to or overlapping with the contents described above with respect to FIG. 8 may be briefly described or omitted.

According to an example, in S805, the user device 802 may display a user screen.

For example, the user device 802 may display the user screen if the user logs in to the user mode by inputting identification information after displaying an initial log-in screen.

According to an example, in S807, the apparatus 801 for managing storage may provide a manager screen display.

For example, the apparatus 801 for managing storage may display a user screen if a user inputs identification information and logs in to a manager mode after displaying the initial log-in screen. The apparatus 801 for managing storage shown in FIG. 8 may be a manager device, but examples of the present disclosure are not limited thereto. For example, the apparatus 801 for managing storage and the manager device may be physically separated devices. In other words, the apparatus 801 for managing storage may be a server that provides various information about storage to the manager device and the user device 802. Hereinafter, an example in which the apparatus 801 for managing storage includes the manager device will be described.

According to an example, in S808, the apparatus 801 for managing storage may provide a manager screen display including information about at least one of CCTV, reservation status, statistics, notification, or a combination thereof.

According to an example, in S810, the user device 802 may select a company.

For example, the user device 802 may receive a selection input for a specified company from among a plurality of companies registered in the apparatus 801 for managing storage and identify (or select) the specified company.

According to an example, in S815, the user device 802 may request information about the selected company from the apparatus 801 for managing storage.

According to one example, in S820, the apparatus 801 for managing storage may provide information about the selected company to the user device 802.

According to an example, in S825, the user device 802 may select a branch.

For example, the user device 802 may receive a selection input for a specified branch from among a plurality of branches operated by a company selected by the apparatus 801 for managing storage from the user, and identify (or select) the specified branch.

According to an example, in S830, the user device 802 may request space information of the selected branch from the apparatus 801 for managing storage.

According to an example, in S835, the apparatus 801 for managing storage may provide space information about the selected branch to the user device 802.

According to an example, in S840, the user device 802 may display space information (S840).

For example, the user device 802 may display the space information including the above-described user interfaces of FIGS. 2 to 5 to the user.

According to an example, in S845, the user device 802 may reserve at least one storage within the selected branch.

For example, the user device 802 may perform one or more storage reservations based on at least a portion of a user input for space information.

According to an example, in S850, the user device 802 may provide a user interface for checking payment details.

For example, the user device 802 may provide the user with information about the finally reserved and paid storage.

According to an example, in S860, the user device 802 may transmit reservation information and payment information to the apparatus 801 for managing storage.

For example, the apparatus 801 for managing storage may use the received reservation information and payment information to update and store a plurality of pieces of storage information stored in the apparatus 801 for managing storage based on at least one of a storage reservation schedule, payment details, user information, or a combination thereof included in the payment information.

FIG. 9 shows an example of an operation of an apparatus for managing storage according to an example of the present disclosure.

According to an example, an apparatus for managing storage (e.g., the apparatus 101 for managing storage of FIG. 1) may perform the operations disclosed in FIG. 9. For example, at least some of the components (e.g., the communication device 110, the memory 120, and/or the controller 130 of FIG. 1) included in the apparatus for managing storage may be configured to perform the operations of FIG. 9.

In the following example, operations of S910 to S940 may be sequentially performed, but are not necessarily sequentially performed. For example, the order of each operation may be changed, and at least two operations may be performed in parallel. In addition or alternative, contents corresponding to or overlapping with the above description with respect to FIG. 9 may be briefly described or omitted.

According to an example, in S910, the controller may receive a request for a target storage including at least one of storage company information, branch information, space information for each branch, or a combination thereof from a user device by using a communication device.

For example, the controller may update the plurality of pieces of storage information based on at least one of a reservation schedule, payment details, user information, or a combination thereof of the plurality of storage included in a payment request if receiving the payment request for at least one of the plurality of storage from the user device.

For example, the request for the target storage may include at least one of a selection signal for a specified company among a plurality of companies registered in the apparatus for managing storage, a selection signal for at least one branch managed by the specified company, or a combination thereof.

For example, the controller may identify and store at least one piece of information about a plurality of companies registered in the apparatus for managing storage, information about a plurality of branches managed by each of the plurality of companies, and at least one of real-time reservation status information, storage arrangement information, storage type information, storage usage fee information, temperature information, humidity information, location information of the specified branch, or a combination thereof in a memory in real time.

According to an example, in S920, the controller may transmit specified storage information corresponding to the storage company information, the branch information, and the space information for each branch among a plurality of pieces of storage information to the user device.

For example, the controller may identify a specified company corresponding to the storage company information from among a plurality of companies registered in the apparatus for managing storage, based on the receiving of the request for the target storage, and identify a specified branch corresponding to the branch information among a plurality of branches managed by the specified company.

For example, the controller may transmit the specified storage information including at least one of the specified company, the specified branch, or a combination thereof to the user device.

For example, the controller may transmit the specified storage information including at least one of real-time reservation status information of the specified branch, storage arrangement information, storage type information, storage usage fee information, temperature information, humidity information, location information of the specified branch, or a combination thereof to the user device, based on the receiving of the request for the target storage.

According to an example, in S930, the controller may receive an experience request for at least one of the plurality of storage included in the specified storage information from the user device, For example, the experience request may include a control signal requesting display of a 3D screen for storage arrangement information and/or storage space information.

According to an example, in S940, the controller may transmit experience information of at least one of the plurality of storage to the user device.

For example, the apparatus for managing storage may transmit 3D model information of at least one of the plurality of storage in the specified branch to the user device based on receiving the experience request from the user device, and generate 3D simulation information based on at least one of the plurality of storage based on the receiving a simulation request signal through a virtual load received from the user device to transmit the generated 3D simulation information to the user device.

For example, the apparatus for managing storage may generate the 3D model information including a 3D space corresponding to at least one of the plurality of storage based on receiving the experience request to transmit the 3D model information to the user device, and transmit the 3D simulation information, which is obtained by adding the virtual load corresponding to a drag-and-drop input, to at least a part in the 3D space to the user device if receiving the simulation request signal including the drag-and-drop input of a user to the user device.

For example, the apparatus for managing storage may divide at least one of the 3D space, the virtual load, or a combination thereof through a grid having a specified size to identify the number of grids for the 3D space, the virtual load, or a combination thereof.

For example, the apparatus for managing storage may calculate a load factor of at least one of the plurality of storage based on a total number of grids of the 3D space and a total number of grids of the virtual load and transmit the calculated load factor to the user device.

For example, the apparatus for managing storage may update the plurality of pieces of storage information in real time based on communication with the user device;

Although not shown in FIG. 9, the apparatus for managing storage may itself function as a manager device.

For example, the apparatus for managing storage may provide real-time image information of a plurality of branches of each of a plurality of companies registered in the apparatus for managing storage in response to a request of manager, provide the plurality of pieces of storage information updated in real time, or provide notification information including messages transmitted/received with external devices in relation to the plurality of pieces of storage information, For example, the plurality of pieces of storage information may include at least one of a number of registered companies, a number of branches for each company, contract and reservation status, a storage reservation extension rate, a number of storage extensions, a cumulative number of reservations, sales per period, incidental expenses, or a combination thereof.

FIG. 10 shows an example of a computing system for executing a method of managing storage according to an example of the present disclosure.

Referring to FIG. 10, a computing system 1000 related to a method of managing storage may include at least one processor 1100, a memory 1300, a user interface input device 1400, a user interface output device 1500, storage 1600, and a network interface 1700 connected through a bus 1200.

The processor 1100 may be a central processing device (CPU) or a semiconductor device that processes instructions stored in the memory 1300 and/or the storage 1600. The memory 1300 and the storage 1600 may include various types of volatile or non-volatile storage media. For example, the memory 1300 may include a ROM (Read Only Memory) and a RAM (Random Access Memory).

Accordingly, the processes of the method or algorithm described in relation to the examples of the present disclosure may be implemented directly by hardware executed by the processor 1100, a software module, or a combination thereof. The software module may reside in a storage medium (e.g., the memory 1300 and/or the storage 1600), such as a RAM, a flash memory, a ROM, an EPROM, an EEPROM, a register, a hard disk, solid state drive (SSD), a detachable disk, or a CD-ROM.

The exemplary storage medium is coupled to the processor 1100, and the processor 1100 may read information from the storage medium and may write information in the storage medium. In another method, the storage medium may be integrated with the processor 1100. The processor and the storage medium may reside in an application specific integrated circuit (ASIC). The ASIC may reside in a user terminal. In another method, the processor and the storage medium may reside in the user terminal as an individual component.

The present disclosure has been made to solve the above-mentioned problems occurring in the prior art while advantages achieved by the prior art are maintained intact.

An example of the present disclosure provides an apparatus for managing storage and method thereof having intuitive and high usability by integrally providing a user with information on each branch operated by various companies.

Another example of the present disclosure provides an apparatus for managing storage and method thereof that can generate a 3D space for a specific storage among a plurality of storage of a specified branch and provide the 3D space to a user if the user transmits a storage experience request for the specified branch, so that it is possible to enable the user to predict services to be provided and organize loaded items remotely without a direct visit.

Still another example of the present disclosure provides an apparatus for managing storage and method thereof that can integrate and manage a plurality of companies that provide storage services, and provide storage usage status or sales in real time, so that it is possible to induce scalability of storage provision services.

Still another example of the present disclosure provides an apparatus for managing storage and method thereof in which users and managers can very conveniently and easily provide information about the corresponding service through a user terminal (e.g., a mobile phone), so that the publicity effect of a storage provision service can be expected.

The technical problems to be solved by the present disclosure are not limited to the aforementioned problems, and any other technical problems not mentioned herein will be clearly understood from the following description by those skilled in the art to which the present disclosure pertains.

According to an example of the present disclosure, an apparatus for managing storage includes a communication device, a memory that stores at least one instruction, and a controller operatively connected to the communication device and the memory, wherein the at least one instruction, if executed by the controller, causes the apparatus for managing storage to receive a request for target storage including at least one piece of storage company information, branch information, space information for each branch, or a combination thereof from a user device by using the communication device, transmit specified storage information corresponding to the storage company information, the branch information, and the space information for each branch among a plurality of pieces of storage information to the user device based on the reception of the request for the target storage, receive an experience request for at least one of a plurality of storage included in the specified storage information from the user device, and transmit experience information for at least one of the plurality of storage to the user device based on the reception of the experience request.

According to an example, the at least one instruction, if executed by the controller, may cause the apparatus for managing storage to update the plurality of pieces of storage information based on at least one of a reservation schedule, payment details, user information, or a combination thereof of the storage included in a payment request if receiving the payment request for at least one of the plurality of storage from the user device by using the communication device.

According to an example, the request for the target storage may include at least one of a selection signal for a specified company among a plurality of companies registered in the apparatus for managing storage, a selection signal for at least one branch managed by the specified company, or a combination thereof.

According to an example, the memory may store information about a plurality of companies registered in the apparatus for managing storage, information about a plurality of branches managed by each of the plurality of companies, and at least one of real-time reservation status information, storage arrangement information, storage type information, storage usage fee information, temperature information, humidity information, location information of the specified branch, or a combination thereof.

According to an example, the at least one instruction, if executed by the controller, may cause the apparatus for managing storage to identify a specified company corresponding to the storage company information from among a plurality of companies registered in the apparatus for managing storage, based on the receiving of the request for the target storage, identify a specified branch corresponding to the branch information among a plurality of branches managed by the specified company, and transmit the specified storage information including at least one of the specified company, the specified branch, or a combination thereof to the user device.

According to an example, the at least one instruction, if executed by the controller, may cause the apparatus for managing storage to transmit the specified storage information including at least one of real-time reservation status information of the specified branch, storage arrangement information, storage type information, storage usage fee information, temperature information, humidity information, location information of the specified branch, or a combination thereof to the user device, based on the receiving of the request for the target storage.

According to an example, the at least one instruction, if executed by the controller, may cause the apparatus for managing storage to transmit 3D model information of at least one of the plurality of storage to the user device based on the receiving of the experience request, and generate 3D simulation information based on at least one of the plurality of storage based on the receiving a simulation request signal through a virtual load received from the user device and transmit the generated 3D simulation information to the user device.

According to an example, the at least one instruction, if executed by the controller, may cause the apparatus for managing storage to generate the 3D model information including a 3D space corresponding to at least one of the plurality of storage based on receiving the experience request and transmit the 3D model information to the user device, and transmit the 3D simulation information, which is obtained by adding the virtual load corresponding to a drag-and-drop input, to at least a part in the 3D space to the user device if receiving the simulation request signal including the drag-and-drop input of a user to the user device.

According to an example, the at least one instruction, if executed by the controller, may cause the apparatus for managing storage to divide at least one of the 3D space, the virtual load, or a combination thereof through a grid having a specified size to identify a number of grids, and calculate a load factor of at least one of the plurality of storage based on a total number of grids of the 3D space and a total number of grids of the virtual load and transmit the calculated load factor to the user device.

According to an example, the at least one instruction, if executed by the controller, may cause the apparatus for managing storage to update the plurality of pieces of storage information in real time based on communication with the user device, and provide real-time image information of a plurality of branches of each of a plurality of companies registered in the apparatus for managing storage in response to a request of manager, provide the plurality of pieces of storage information updated in real time, or provide notification information including messages transmitted/received with external devices in relation to the plurality of pieces of storage information, wherein the plurality of pieces of storage information includes at least one of the number of registered companies, the number of branches for each company, contract and reservation status, a storage reservation extension rate, the number of storage extensions, the cumulative number of reservations, sales per period, incidental expenses, or a combination thereof.

According to another example of the present disclosure, a method of managing storage includes receiving, by a controller, a request for target storage including at least one piece of storage company information, branch information, space information for each branch, or a combination thereof from a user device by using a communication device, transmitting, by the controller, specified storage information corresponding to the storage company information, the branch information, and the space information for each branch among a plurality of pieces of storage information to the user device based on the receiving of the request for the target storage, receiving, by the controller, an experience request for at least one of a plurality of storage included in the specified storage information from the user device by using the communication device, and transmitting, by the controller, experience information for at least one of the plurality of storage to the user device based on the reception of the experience request by using the communication device.

According to an example, the method may further include updating the plurality of pieces of storage information based on at least one of a reservation schedule, payment details, user information, or a combination thereof of the storage included in a payment request if receiving the payment request for at least one of the plurality of storage from the user device by using the communication device.

According to an example, the request for the target storage may include at least one of a selection signal for a specified company among a plurality of companies registered in the apparatus for managing storage, a selection signal for at least one branch managed by the specified company, or a combination thereof.

According to an example, the method may further include storing, by the controller, information about a plurality of companies registered in the apparatus for managing storage, information about a plurality of branches managed by each of the plurality of companies, and at least one of real-time reservation status information, storage arrangement information, storage type information, storage usage fee information, temperature information, humidity information, location information of the specified branch, or a combination thereof in a memory.

According to an example, the transmitting of the specified storage information to the user device by the controller may include identifying, by the controller, a specified company corresponding to the storage company information from among a plurality of companies registered in the apparatus for managing storage, based on the receiving of the request for the target storage, identifying, by the controller, a specified branch corresponding to the branch information among a plurality of branches managed by the specified company, and transmitting, by the controller, the specified storage information including at least one of the specified company, the specified branch, or a combination thereof to the user device.

According to an example, the transmitting of the specified storage information to the user device by the controller may include transmitting, by the controller, the specified storage information including at least one of real-time reservation status information of the specified branch, storage arrangement information, storage type information, storage usage fee information, temperature information, humidity information, location information of the specified branch, or a combination thereof to the user device, based on the receiving of the request for the target storage.

According to an example, the transmitting of the experience information to the user device by the controller may include transmitting, by the controller, 3D model information of at least one of the plurality of storage to the user device based on the receiving of the experience request, and generating, by the controller, 3D simulation information based on at least one of the plurality of storage based on the receiving a simulation request signal through a virtual load received from the user device and transmit the generated 3D simulation information to the user device.

According to an example, the transmitting of the experience information to the user device by the controller may include generating, by the controller, the 3D model information including a 3D space corresponding to at least one of the plurality of storage based on receiving the experience request and transmit the 3D model information to the user device, and transmitting, by the controller, the 3D simulation information, which is obtained by adding the virtual load corresponding to a drag-and-drop input, to at least a part in the 3D space to the user device if receiving the simulation request signal including the drag-and-drop input of a user to the user device.

According to an example, the transmitting of the experience information to the user device by the controller may include dividing, by the controller, at least one of the 3D space, the virtual load, or a combination thereof through a grid having a specified size to identify a number of grids, and calculating, by the controller, a load factor of at least one of the plurality of storage based on a total number of grids of the 3D space and a total number of grids of the virtual load and transmit the calculated load factor to the user device.

According to an example, the method may further include updating, by the controller, the plurality of pieces of storage information in real time based on communication with the user device, and providing, by the controller, real-time image information of a plurality of branches of each of a plurality of companies registered in the apparatus for managing storage in response to a request of manager, providing the plurality of pieces of storage information updated in real time, or providing notification information including messages transmitted/received with external devices in relation to the plurality of pieces of storage information, wherein the plurality of pieces of storage information includes at least one of the number of registered companies, the number of branches for each company, contract and reservation status, a storage reservation extension rate, the number of storage extensions, the cumulative number of reservations, sales per period, incidental expenses, or a combination thereof.

Effects of the apparatus and method for managing storage according to the examples of the present disclosure are described below.

According to at least one of the example of the present disclosure, the apparatus for managing storage may provide a user with information such as the current status of storage provision services provided by a plurality of companies and/or a plurality of branches in real time, so that the user's accessibility is expanded.

In addition or alternative, according to at least one of the example of the present disclosure, by integrating a plurality of spaces (e.g., at least one branch) and managing them as a single platform, a manager may consider expanding a service more easily at a lower cost.

In addition or alternative, according to at least one of the example of the present disclosure, by updating and providing storage information to a user and/or a manager in real time through a user terminal (e.g., a mobile phone, a laptop computer, a computer, or the like), it is possible to provide intuitive and convenient services and additionally or alternatively enjoy promotional effects.

In addition or alternative, various effects that are directly or indirectly understood through the present disclosure may be provided.

Although examples of the present disclosure have been described for illustrative purposes, those skilled in the art will appreciate that various modifications, additions and substitutions are possible, without departing from the scope and spirit of the disclosure.

Therefore, the examples disclosed in the present disclosure are provided for the sake of descriptions, not limiting the technical concepts of the present disclosure, and it should be understood that such examples are not intended to limit the scope of the technical concepts of the present disclosure. The protection scope of the present disclosure should be understood by the claims below, and all the technical concepts within the equivalent scopes should be interpreted to be within the scope of the right of the present disclosure.

What is claimed is:

1. An apparatus comprising:
a controller; and
a memory configured to store at least one instruction that, when executed by the controller, causes the apparatus to:
    receive, from a user device, a request for storage information, the request including at least one of storage company information, branch information, or space information for each branch;
    identify, based on the request, a first storage of a plurality of storages associated with the storage information;
    cause output, via a user interface of the user device, of a three-dimensional (3D) space associated with the first storage of the plurality of storages, wherein:
        a first portion of the user interface comprises a 3D model of the first storage; and
        a second portion of the user interface comprises one or more user interface elements corresponding to one or more loads;
    divide, based on a size of a grid, the 3D model of the storage into a plurality of regions;
    receive, via the user device, first user drag-and-drop input from a first user interface element to the 3D model of the first storage;
    cause output, via the user interface, of a first 3D representation of a first load corresponding to the first user interface element;

receive, via the user device, second user drag-and-drop input from a second user interface element to the 3D model of the first storage;
    cause output, via the user interface, of a second 3D representation of a second load, different from the first load, corresponding to the second user interface element;
    determine, based on properties of the first load and a total number of the plurality of regions of the 3D model of the first storage, a load factor of the first storage; and
    cause the user device to output, via the user interface, the load factor.

2. The apparatus of claim 1, wherein the at least one instruction, when executed by the controller, causes the apparatus to cause output of the 3D representation of the first load at a first region of the plurality of regions of the 3D model of the first storage.

3. The apparatus of claim 1, wherein the at least one instruction, when executed by the controller, causes the apparatus to cause output of the 3D representation of the first load based on dimensions of the first load.

4. The apparatus of claim 1, wherein the at least one instruction, when executed by the controller, causes the apparatus to determine the load factor by dividing a total number of loads by the total number of grids in the 3D space.

5. The apparatus of claim 1, wherein the at least one instruction, when executed by the controller, causes the apparatus to determine the load factor based on 3D modeling data corresponding to the first load and the second load.

6. The apparatus of claim 1, wherein the at least one instruction, when executed by the controller, causes the apparatus to identify the first storage of the plurality of storages by causing the apparatus to:
    display a two-dimensional map representing at least a portion of the plurality of storages; and
    receive, via the user interface, a selection of the first storage from the at least the portion
of the plurality of storages.

7. The apparatus of claim 1, wherein the at least one instruction, when executed by the controller, causes the apparatus to cause output of the
3D space based on a request, via the user interface, for a 3D representation of the first storage.

8. The apparatus of claim 1, wherein the at least one instruction, when executed by the controller, causes the apparatus to:
    cause display, via the user device, of a video feed corresponding to the first storage.

9. A method comprising:
receiving, by a controller of an apparatus and from a user device, a request for storage information, the request including at least one of storage company information, branch information, or space information for each branch;
identifying, based on the request, a first storage of a plurality of storages associated with the storage information;
causing output, via a user interface of the user device, of a three-dimensional (3D) space associated with the first storage, wherein:
    a first portion of the user interface comprises a 3D model of the first storage; and
    a second portion of the user interface comprises one or more user interface elements corresponding to one or more loads;

dividing, based on a size of a grid, the 3D model of the storage into a plurality of regions;

receiving, via the user device, first user drag-and-drop input from a first user interface element to the 3D model of the first storage:

causing output, via the user interface, of a first 3D representation of a first load corresponding to the first user interface element;

receiving, via the user device, second user drag-and-drop input from a second user interface element to the 3D model of the first storage;

causing output, via the user interface, of a second 3D representation of a second load, different from the first load, corresponding to the second user interface element;

determining, based on properties of the first load and a total number of the plurality of regions of the 3D model of the first storage, a load factor of the first storage; and causing the user device to output, via the user interface, the load factor.

10. The method of claim 9, wherein the causing output of the 3D representation of the first load comprises causing the output at a first region of the plurality of regions of the 3D model of the first storage.

11. The method of claim 9, wherein the causing the output of the 3D representation of the first load is based on dimensions of the first load.

12. The method of claim 9, wherein the determining the load factor comprises dividing a total number of loads by the total number of grids in the 3D space.

13. The method of claim 9, wherein the determining the load factor is further based on 3D modeling data corresponding to the first load and the second load.

14. The method of claim 9, wherein the identifying the first storage of the plurality of storages comprises:

displaying a two-dimensional map representing at least a portion of the plurality of storages; and receiving, via the user interface, a selection of the first storage from the at least the portion of the plurality of storages.

15. The method of claim 9, wherein the causing the output of the 3D space is based on a request, via the user interface, for a 3D representation of the first storage.

16. The method of claim 9, further comprising:

causing display, via the user device, of a video feed corresponding to the first storage.

17. An apparatus comprising:

one or more processors; and memory storing instructions that, when executed by the one or more processors, cause the apparatus to:

receive, from a user device, a a selection of a first storage of a plurality of storages;

cause output, via a user interface of the user device, the user device, of a three-dimensional (3D) space associated with the first storage of the plurality of storages, wherein:

a first portion of the user interface comprises a 3D model of the first storage; and a second portion of the user interface comprises one or more user interface elements corresponding to one or more loads;

divide, based on a size of a grid, the 3D space into a plurality of regions;

receive, via the user device, first user drag-and-drop input from a first user interface element to the 3D model of the first storage;

cause output, via the user interface, of a first 3D representation of a first load corresponding to the first user interface element;

receive, via the user device, second user drag-and-drop input from a second user interface element to the 3D model of the first storage;

cause output, via the user interface, of a second 3D representation of a second load, different from the first load, corresponding to the second user interface element;

determine, based on properties of the first load, based on a first number of grids for the 3D space, and based on a second number of grids for the first load, a load factor of the first storage; and cause the user device to output, via the user interface the load factor.

* * * * *